(No Model.)
H. P. MORGAN.
VALVE FOR AIR COMPRESSORS.
No. 392,054. Patented Oct. 30, 1888.
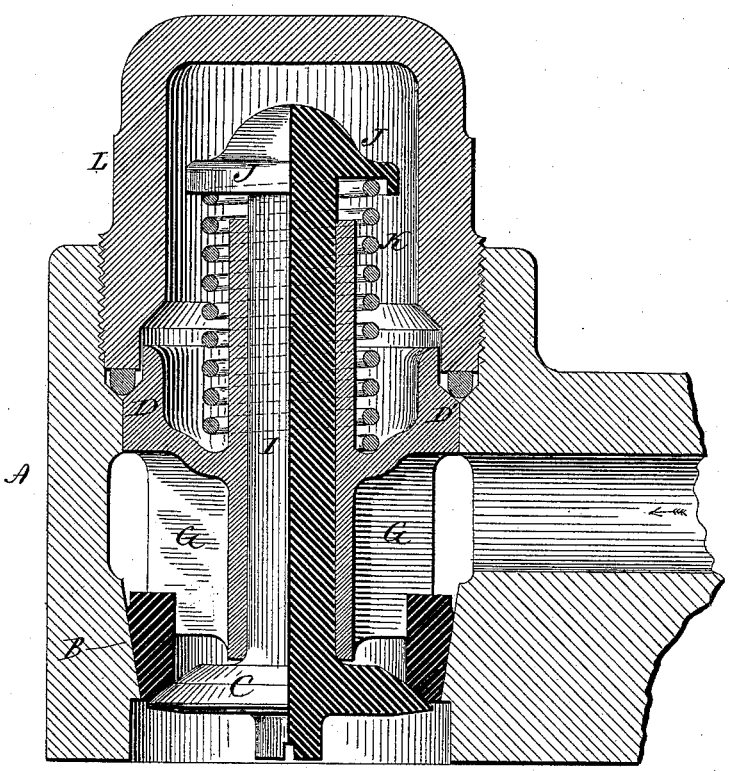
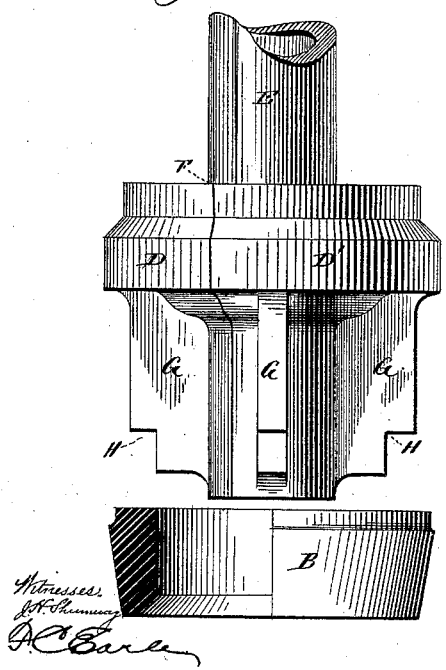
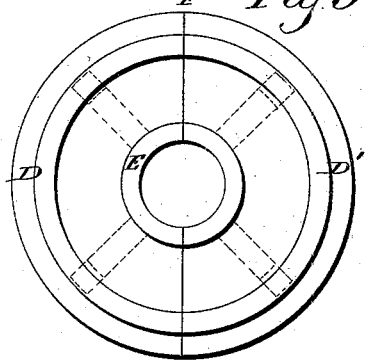
Witnesses:
Henry P. Morgan, Inventor,
By atty.

UNITED STATES PATENT OFFICE.

HENRY P. MORGAN, OF SOUTH NORWALK, CONNECTICUT, ASSIGNOR TO THE NORWALK IRON WORKS COMPANY, OF SAME PLACE.

VALVE FOR AIR-COMPRESSORS.

SPECIFICATION forming part of Letters Patent No. 392,054, dated October 30, 1888.

Application filed July 9, 1888. Serial No. 279,362. (No model.)

*To all whom it may concern:*

Be it known that I, HENRY P. MORGAN, of South Norwalk, in the county of Fairfield and State of Connecticut, have invented a new Improvement in Valves for Air-Compressors; and I do hereby declare the following, when taken in connection with accompanying drawings and the letters of reference marked thereon, to be a full, clear, and exact description of the same, and which said drawings constitute part of this specification, and represent, in—

Figure 1, a vertical central section showing the valve in half side view, the section cutting at right angles to the division of the guide-ring and tube; Fig. 2, a side view of the valve-ring, showing it in half vertical section, and the guide-ring and tube as detached therefrom; Fig. 3, a top view of the guide-ring and its tube, showing the division.

This invention relates to an improvement in that class of valves which are employed in apparatus where the valve is required to resist a great pressure—such as in air-compressors. In this class of valves a spring is necessary to insure the yielding retention of the valve upon its seat, as well as to insure its quick return, and this in addition to the great pressure incident to the use of the valve produces a heavy shock every time the valve returns to its seat after having been opened, commonly called "hammer." The valve is constructed with a spindle concentric with its seat, which serves as a guide for the movement of the valve. The end of the spindle opposite the valve is provided with a collar and usually with a screw-nut, against which the spring bears. The hammer of the valve produces such a jar upon the stem that the nut is frequently loosened and various devices are employed to prevent this removable nut and collar from disadjustment under such hammer.

The object of my invention is to construct the valve-spindle with the collar as an integral part thereof, so that no amount of hammer can produce a disadjustment of that collar or the spring bearing thereon.

As commonly constructed this class of valves consists of a case having a valve-seat ring set therein, upon which the valve may rest, the valve-seat being upon one side of the inlet or outlet passage, as the case may be, and upon the opposite side of that passage a second ring is arranged in the case, connected to the valve-seat ring, so as to form what is commonly called a "valve-cage." The central tube for the guiding of the spindle being made an integral part of the cage, it is therefore necessary that the collar on the end of the valve-stem shall be removable, in order to permit the introduction of the valve-stem through the guiding-tube.

In the accompanying drawings, A represents the case, B the valve-seat, which is of ring-shape and supported in the case and so that the valve C may rest upon the seat.

D represents the second ring of the valve-cage; but instead of making the second ring, D, and the valve-seat ring B integral the one with the other, I construct the seat-ring separate. As seen in Fig. 2, it is simply a ring seated in the case. The ring D is constructed with a central tube, E, as a guide for the valve-spindle; but this ring is divided in the plane of its axis into two parts, D D, as indicated in Figs. 2 and 3, the line F indicating the division between the two parts. From the parts of the ring, wings G extend toward the ring B and are constructed with shoulders H to rest upon the valve-seat ring, as seen in Figs. 1 and 2, so that when the two parts D D of the guide-ring are in place the wings form a connection between the guide-ring and the valve-seat ring and make the valve-cage.

The valve C is constructed with a stem, I, which extends through the tubular guide E, but longer than that tube, so as to permit the requisite play of the valve. The end of the spindle opposite the valve is upset to form a collar, J, integral with the spindle, and this collar is of larger diameter than the guide-tube, and so as to form a bearing for the one end of a spring, K, the other end of the spring K supported from the guide-ring D below. The opening through the case above the valve-seat is so much larger than the cage and valve-seat ring as to permit the introduction of the cage through that end of the case, and that end of the case is closed by a cap, L, which takes a bearing directly or indirectly upon the cage, so as to hold it in place.

The particular construction of the cage and case shown, whereby the cap is made to produce a bearing upon both the case and cage, is the invention of another and constitutes no part of my invention.

To introduce the cage and valve to place, the two parts of the guide portion of the cage are set around the spindle. Then the spring is worked onto the spindle over the collar. This is easily done, because the spring is so elastic as to permit its convolutions to be opened so as to work over the collar to its place under the collar, something like the operation of a screw, the valve-ring having also been placed upon the valve and against the shoulders of the respective wings. Thus assembled, the cage and valve are set into their place in the case and the cap applied. Whenever it is necessary to remove the valve and its seat, as for the purpose of grinding or refacing the valve and its seat, the operation is reversed.

By making the spring-bearing collar of the spindle an integral part of the spindle all possibility of disadjustment of the collar by the hammer of the valve is avoided.

In this representation I have shown the invention as applied to the inlet-valve of an air-compressor; but this illustration will be sufficient to enable others skilled in the art to apply my invention to other valves in which the cage is employed.

In some cases the spring is unnecessary, and may therefore be omitted without departing from my invention, the essential feature of which is the construction of the valve-spindle with the collar as an integral part thereof and dividing the guide portion of the cage.

I claim—

1. In a valve substantially such as described, the combination of a case, a valve-seat ring supported in said case, a guide-ring distant from but concentric with the said valve-seat ring, the said guide-ring constructed with a central concentric guide-tube and wings extending to the valve-seat ring, the said wings forming a connection between the valve-seat ring and the guide-tube ring, the said guide-ring and tube divided longitudinally in the plane of the axis, combined with a valve adapted to rest upon said seat-ring and constructed with a spindle extending therefrom through said divided guide, the said spindle constructed at its other end with a collar as an integral part thereof but of larger diameter than the diameter of the guide, substantially as described.

2. In a valve substantially such as described, the combination of a case, a valve-seat ring supported in said case, a guide-ring distant from but concentric with the said valve seat ring, the said guide-ring constructed with a central concentric guide-tube and wings extending to the valve-seat ring, the said wings forming a connection between the valve-seat ring and the guide-tube ring, the said guide-ring and tube divided longitudinally in the plane of the axis, combined with a valve adapted to rest upon said seat-ring and constructed with a spindle extending therefrom through said divided guide, the said spindle constructed at its other end with a collar as an integral part thereof but of larger diameter than the diameter of the guide, and a spring around the spindle between said guide-ring and said collar, substantially as described.

HENRY P. MORGAN.

Witnesses:
 EBENEZER HILL,
 JOHN A. SLATER.